UNITED STATES PATENT OFFICE.

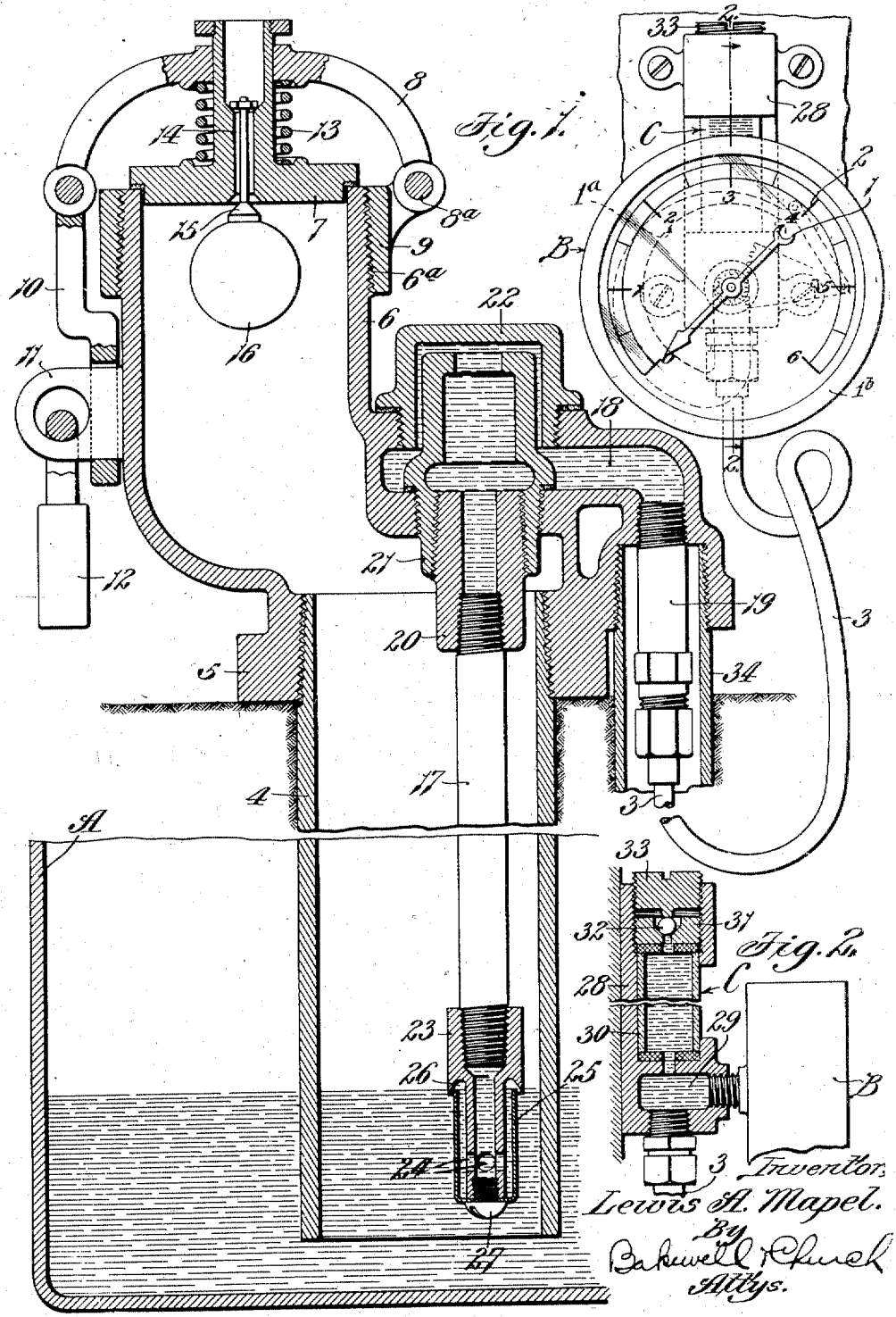

LEWIS A. MAPEL, OF ST. LOUIS, MISSOURI, ASSIGNOR TO MECHANICAL DEVELOPMENT COMPANY OF MISSOURI, OF ST. LOUIS, MISSOURI, A CORPORATION OF MISSOURI.

LIQUID-STORAGE APPARATUS.

1,247,855.  Specification of Letters Patent.  Patented Nov. 27, 1917.

Application filed May 25, 1916. Serial No. 99,839.

*To all whom it may concern:*

Be it known that I, LEWIS A. MAPEL, a citizen of the United States, residing at St. Louis, Missouri, have invented a certain new and useful Improvement in Liquid-Storage Apparatus, of which the following is a full, clear, and exact description, such as will enable others skilled in the art to which it appertains to make and use the same.

This invention relates to tanks or containers that are used for storing liquids.

One object of my invention is to provide a liquid storage apparatus that comprises a novel means for indicating or recording the level or the quantity of the liquid stored in the apparatus.

Another object is to provide a liquid storage apparatus of the character referred to which is so constructed that it is practicable to arrange the indicator or recorder some distance from the tank in which the liquid is stored.

Another object is to provide a device that will correctly indicate or record the level or quantity of a body of liquid without the aid of a float.

Another object is to provide a liquid storage apparatus that is of simple construction and not liable to get out of order when in use.

And still another object is to provide a liquid storage apparatus that is particularly adapted for use for storing naphtha, gasolene and other liquids which are usually stored in underground tanks, the complete apparatus comprising an underground tank equipped with an efficient means of novel construction for preventing an unauthorized person from obtaining access to the tank, and an indicating device arranged above the ground and combined with means that causes said indicating device to show at all times the approximately exact level or quantity of the liquid in the tank. Other objects and desirable features of my invention will be hereinafter pointed out.

Figure 1 of the drawings is a vertical sectional view of a liquid storage apparatus constructed in accordance with my invention; and Fig. 2 is a vertical sectional view, taken on the line 2—2 of Fig. 1.

Referring to the drawings, which illustrate the preferred form of my invention, A designates a tank or container that is adapted to hold a liquid, and B designates a means for showing either the level or the quantity of liquid in the tank A. In the form of my invention herein illustrated said means consists of an indicator provided with a movable hand 1 that travels over a dial 2 marked with numerals that represent the depth of the liquid in the tank A, but I wish it to be understood that my invention is not limited to an apparatus equipped with an indicator of the type herein shown, as various other forms of indicating or recording devices can be used successfully in place of the indicator B herein illustrated, which is a gage of well known form provided with a hollow Bourdon spring or bent tube 1ª, shown in broken lines in Fig. 1, that expands and contracts and thus effects a change in the position of the hand 1, said Bourdon spring being arranged inside of a casing 1ᵇ that is unsealed, or, in other words, constructed in such a manner that the spring 1ª is open to the atmosphere. In fact, it is immaterial whether the apparatus is provided with a recording device, a registering device or a combined recording and registering device, and therefore, I have used the term "indicating device" in the claims in the sense that the term indicator is defined in *Knight's Mechanical Dictionary*, namely, "a marking or recording instrument or one which makes a visible sign by which the condition of the object or apparatus to which it is attached may be observed." A column of liquid is arranged between the body of liquid in the tank A and the Bourdon spring 1ª of the indicator B in such a manner that the weight of said column of liquid acting on said Bourdon spring causes said spring to move in one direction or the other as the body of liquid in the tank A varies. In view of the fact that the hand 1 of the indicator is controlled by the Bourdon spring, said hand 1 will move in one direction over the dial of the indicator when the level of the body of liquid in the tank A rises, and in the opposite direction over said dial when the level of the body of liquid in the tank A drops. The column of liquid above referred to is confined in a conduit or passageway whose upper end is closed to the atmosphere, so as to prevent the upper end of said liquid column from being subjected to atmospheric pressure whose upper end is closed so as to prevent the upper end of the column of liquid from being subjected to atmospheric pressure. In the apparatus herein shown the tank A is provided with a number of pipes, fittings or hollow members that form part of the conduit just referred to, and the remainder of said conduit is formed by a small tube 3, preferably a hollow wire, that leads from the tank A to the Bourdon tube of the indicator B. If the tank A is intended to be buried under the ground, as in the apparatus herein shown, said tank is provided with a filling pipe 4 whose upper end terminates above the ground and whose lower end terminates in proximity to the bottom of the tank. A cap 5 that is screwed on the upper end of the filling pipe 4 is provided with a tubular-shaped portion 6 into which a supply line can be inserted or connected to external screw threads 6$^a$ on the upper end of same, the upper end of said tubular-shaped portion 6 being normally closed by a cover 7 carried by a yoke 8 that is pivotally connected at 8$^a$ to a collar 9 screwed onto the upper end of the tubular-shaped portion 6 of the cap 5. The yoke 8 is provided with a pivotally mounted hasp 10 that is adapted to be slipped over an eye 11 on the portion 6 of the cap 5, so as to enable the yoke 8 and the cover 7 carried by same to be locked by means of a padlock or other suitable key-controlled locking device 12. The cover 7 is normally pressed tightly against the upper edge of the portion 6 of the cap by means of a coiled spring 13 arranged between the upper side of said cover and the yoke 8, and said cover is provided with a vent opening 14 through which the stem of a valve 15 passes freely, said valve being attached to a float 16, which causes said valve to move upwardly, and thus close the vent opening 14 in case the liquid in the tank A, or rather in the filling pipe 4 rises high enough to act on the float 16. A pipe 17 that projects downwardly through the filling pipe 4 and terminates adjacent the bottom of the tank A forms part of the conduit or passageway in which the liquid column is confined, the upper end of said pipe 17 communicating with a passageway 18 in the cap 5 that communicates with a pipe 19 to which one end of the tube 3 is connected, said pipes 17 and 19 both being carried by the cap 5, and the pipe 17 being so mounted that it can be drawn upwardly through said cap if it becomes necessary to clean or repair said pipe or a device on the lower end of same that forms a liquid seal for the column of liquid in said pipe. It is immaterial, so far as my broad idea is concerned, how the pipe 17 is mounted, but I have shown the upper end of said pipe as being screwed into a nipple 20, which, in turn, is screwed into a tubular-shaped member 21 that is screwed into the lower side of the passageway 18 in the cap 5, the upper end of said tubular-shaped member projecting upwardly through a hole in the upper side of said passageway that is normally closed by a cover 22 that can be removed when it is desired to remove the tubular-shaped member 21 and the pipe 17 carried by same. The device at the lower end of the pipe 17 previously referred to consists of a tubular-shaped member 23 screwed onto said pipe and provided adjacent its lower end with one or more side inlet ports 24, said member having mounted thereon a sleeve 25 whose upper edge terminates some distance above the inlet ports 24 and lies under a flange 26 on the member 23 that projects laterally and downwardly over the upper edge of the sleeve 25. In the apparatus herein shown the sleeve 25 is connected to the member 23 by a screw 27 that acts as a closure for the lower end of said member 23. If desired, the upper end of the small tube 3 that forms part of the passageway for the liquid column can be connected to a liquid sight gage C that carries the indicator B, which sight gage is so constructed that a pump can be connected to same to draw the liquid in the tank A up through the pipe 17, the passageway 18, the pipe 19 and the tube 3 when the apparatus is first put in operation. As shown in Fig. 2, this sight gage C consists of a casting 28 provided with a chamber 29 with which the indicator B and the upper end of the tube 3 communicate, the glass member 30 of said sight gage communicating with the chamber 29 and being retained in position by a plug 31 provided with a check valve 32 that is normally held seated by a plug 33 in the upper end of the casting 28 that can be removed when it is desired to connect a pump to said casting 28, so as to draw liquid up into the conduit or passageway in which the liquid column is confined.

When the apparatus is installed, a column of liquid is first established in the passageway leading from the tank to the Bourdon spring or governing element of the indicating device, either by drawing liquid up into said passageway by means of a pump connected to the casting 28, or in any other suitable manner, and the upper end of said passageway is then cut off from the atmosphere, so as to prevent the upper end of the liquid column from being subjected to atmospheric pressure or to as great a pressure as the lower end of the liquid column is subjected to. In view of the fact that said passageway communicates with the interior of the Bourdon spring of the gage B, the weight of the column of liquid in said passageway between the surface of the liquid in the tank and the indicating device will be exerted on the Bourdon spring and will cause said spring to move in one direction. It is evident that the effective length of the liquid column which acts to determine the position of the governing element by the pull due to its weight, is the length between the surface of the liquid in the tank at any moment and the indicating device. In an installation of the kind herein illustrated the weight of the liquid column will exert a pull on the Bourdon spring and will cause said spring to contract. After the liquid column has been established the hand 1 of the indicator is set at zero on the dial, it, of course, being understood that the tank A is then empty or contains only a small quantity of liquid of which no account is taken by the hand of the indicator. The apparatus is now in condition to receive the liquid that is to be stored, the hand 1 of the indicator being held at zero on the dial by the weight or downward pull that the column of liquid exerts on the Bourdon spring. When liquid is introduced in the tank A, the hand 1 of the indicator will start to move away from zero on the dial more or less according to the quantity of liquid introduced into the tank, on account of the diminution in weight of the liquid column. If, for example, the height of the liquid column is 20 feet, the Bourdon spring will be subjected to a pull equal to the weight of a 20 foot liquid column, when the tank is empty. When liquid is introduced into the tank A to a depth of one foot, the liquid in said tank will balance one foot of liquid in the liquid column, thus diminishing the pull that the liquid column exerts on the Bourdon spring an amount equal to the weight of one foot of liquid in the liquid column, thus leaving only 19 feet of liquid in the liquid column to exert a pull on the Bourdon spring. Consequently, the Bourdon spring will expand sufficiently to cause the hand 1 of the indicator to move to the numeral 1 on the dial and show that the tank A contains one foot of liquid. As the level of the liquid in the tank A rises, the weight of the effective length of the liquid column diminishes correspondingly, and consequently, exerts less pull on the Bourdon spring or governing element of the indicating device. When the level of the liquid in the tank A drops, the effective length of the liquid column increases and consequently its weight increases in direct proportion to the rate that the level of the liquid in the tank drops, and consequently, causes the Bourdon spring to contract and move the hand 1 of the indicator toward zero. It will thus be seen that in my improved apparatus the governing element of the indicating device is controlled directly by the weight of the liquid column, which weight varies in direct proportion to the variation in the level of the body of liquid in the storage tank of the apparatus. After the apparatus has been put in operation by drawing the liquid up into the conduit arranged between the tank A and the indicator B, the column of liquid remains in said conduit, even though all of the liquid is drawn out of the tank A, on account of the fact that the cup 25 that forms part of the device 23 mounted on the lower end of the pipe 17 always contains sufficient liquid to cover the inlet ports 24 at the lower end of said conduit, and thus prevents air from passing up through the liquid column and breaking the vacuum at the upper end of said column, or, in other words, equalizing the pressure at the upper end of the column. The cup 25 is long enough so that the normal contraction of the liquid in said cup will not lower the level of said liquid, during a period, say, of one or two days sufficiently to uncover the inlet ports 24, thus insuring a liquid seal for the column of liquid when the apparatus is operating under normal conditions. The sight gage C provides a convenient means for enabling the operator in charge of the apparatus to ascertain at any time the condition of the column of liquid, for any leakage of air into the conduit that contains said liquid column will result in a drop in said column which can be seen through the glass member 30 of the gage C. The pipe 17 and the liquid sealing device at the lower end of same can be completely withdrawn from the tank without removing the cap 5 on the filling pipe 4, and still another desirable feature of such an apparatus is that the cap 5 and the cover 7 cannot be removed by an unauthorized person without mutilating or destroying the apparatus, owing to the fact that the cover 7 is secured in position by a key-controlled lock and the cap 5 is held against rotation by a tubular-shaped housing member 34 at one side of said cap that projects downwardly into the ground so as to house the pipe 19 and the lower portion of the tube 3. The yoke 8 and the hasp 10 carried thereby not only prevent the cover 7 from being opened, but they also prevent the collar 9 that carries said cover from being unscrewed from the portion 6 of the filling cap 5, on account of the fact that the yoke 8 is connected at one end to said collar and the hasp 10 on said yoke is arranged in engagement with the lug 11 on the portion 6 of the filling cap. As the cover 7 is yieldingly held on its seat, it will open automatically sufficiently to permit the escape of any gases that generate in the tank A, thus preventing the tank from exploding, and if the tank is connected to another tank in such a manner that the liquid from one tank can be run into the other, there is no possibility of filling the tank so full that the liquid will escape through the vent opening 14, in view of the fact that said vent opening is controlled by a valve 15 carried by a float 16.

While my broad idea is particularly applicable to a liquid storage apparatus in which the tank is buried under the ground, I wish it to be understood that my invention is not limited to an apparatus equipped with an underground tank, as my broad idea consists in operating an indicating or recording device by means of a column of liquid interposed between said device and a body of liquid in such a manner that the weight of said column of liquid acting on the governing element of said device causes said governing element to move in one direction or the other automatically as the level of said body of liquid varies and thus causes the device to indicate or record either the level of the body of liquid or the quantity of same. By using a column of liquid in the manner described to operate the indicating device I obtain a more accurate reading than is possible with an apparatus in which air, gas or other compressible fluid is arranged between the indicating device and the body of liquid, and by equipping the apparatus with an indicating device whose governing element, for example, the Bourdon tube 1ª of the device herein shown, is open to the atmosphere, I overcome the liability of obtaining a false reading, due to atmospheric changes. In other words, in my apparatus, the liquid in the supply tank and the governing element of the indicator are both under atmospheric pressure at all times, and consequently, any atmospheric changes that would result in a variation in the pressure on the liquid in the tank would have a like effect on the governing element of the indicator. Furthermore, as the column of liquid is in direct communication with the supply of liquid in the tank, any normal expansion or contraction of the liquid column will have no effect on the commercial accuracy of the apparatus.

Having thus described my invention, what I claim, and desire to secure by Letters Patent, is:

1. A means for indicating the depth or the quanity of a body of liquid, comprising an indicating device provided with a governing element that is capable of moving in opposite directions, and means for confining a continuous column of liquid between said device and the body of liquid, whereby the weight of the effective length of said liquid column acting on said governing element acts to determine the position of same and cause the indicating device to show at all times the approximately exact quantity or depth of said body of liquid.

2. A means for indicating the depth or the quantity of a body of liquid, comprising an indicating device provided with a governing element that is capable of moving in opposite directions, and means for confining a continuous column of liquid between said body of liquid and the governing element of said indicating device, so that the weight of the effective length of said liquid column exerted on said governing element will cause it to move in one direction or the other in accordance with the rise and fall in the level of said body of liquid.

3. A means for indicating the depth or the quantity of a body of liquid, comprising an indicating device provided with a governing element that is capable of moving in opposite directions, a passageway leading from said body of liquid to said governing element and closed to the atmosphere, and a column of liquid filling said passageway, so that the weight of the effective length of said liquid column exerts a pull on said governing element which causes it to move in one direction.

4. A means for indicating the depth or the quantity of a body of liquid, comprising an indicating device provided with a governing element that is capable of moving in opposite directions, a passageway leading from said body of liquid to said governing element and closed to the atmosphere, and a column of liquid filling said passageway, so that the weight of the effective length of said liquid column exerts a pull on said governing element which causes it to move in one direction, the lower end of said liquid column being in direct communication with the body of liquid, thereby causing the effective length of said liquid column to vary and consequently effecting a change in the position of said governing element as the level of said body of liquid varies.

5. A liquid storage apparatus, comprising a tank or container for holding a body of liquid, an indicating device provided with a governing element that is capable of moving in opposite directions, a passageway leading from said tank to said governing element, closed at its upper end to the atmosphere and having its lower end communicating with said tank, a column of liquid filling said passageway, whereby the weight of the effective length of said column of liquid exerts a pull on said governing element which causes said element to move in one direction, and means for preventing the liquid column from escaping from said passageway when the level of the liquid in said tank drops below the intake at the lower end of said passageway.

6. A liquid storage apparatus, comprising a tank for holding a body of liquid that is subjected to atmospheric pressure, an indicating device provided with a governing element that is capable of moving in opposite directions, said governing element being exposed to the atmosphere, a conduit or passageway having one of its ends communicating with the interior of said tank and its opposite end sealed to the atmosphere by said governing element, and a column of liquid filling said passageway, whereby the weight of the effective length of said column exerted on said governing element causes said element to move in one direction and the rise and fall in the level of the body of liquid in the tank causes the effective length of said liquid column to vary.

7. An apparatus of the character described, comprising a tank that is adapted to hold a body of liquid, an indicating device provided with a movable governing element, a conduit leading from said governing element to said tank, a column of liquid filling said conduit, so that the weight of the effective length of said column acts to determine the position of same and to cause the indicating device to show at all times the approximately exact quantity or depth of the body of the liquid in said tank, and a cup at the lower end of said conduit that is adapted to contain sufficient liquid to cover the inlet at the lower end of said conduit when the liquid in said cup contracts under normal conditions at times when the level of the body of liquid in the tank is below the inlet opening of said conduit.

LEWIS A. MAPEL.

It is hereby certified that in Letters Patent No. 1,247,855, granted November 27, 1917, upon the application of Lewis A. Mapel, of St. Louis, Missouri, for an improvement in "Liquid-Storage Apparatus," errors appear in the printed specification requiring correction as follows: Page 1, line 108, after the word "pressure" insert a period; same page and line, beginning with the word "whose" strike out all to and including the word "pressure," line 1, page 2; page 4, line 49, claim 1, for the word "quanity" read *quantity;* and that the said Letters Patent should be read with these corrections therein that the same may conform to the record of the case in the Patent Office.

Signed and sealed this 30th day of April, A. D., 1918.

[SEAL]

F. W. H. CLAY,

*Acting Commissioner of Patents.*

Cl. 73 – 54.